(12) United States Patent
Gu et al.

(10) Patent No.: US 11,908,483 B2
(45) Date of Patent: Feb. 20, 2024

(54) INTER-CHANNEL FEATURE EXTRACTION METHOD, AUDIO SEPARATION METHOD AND APPARATUS, AND COMPUTING DEVICE

(71) Applicant: Tencent Technology (Shenzhen) Company Limited, Shenzhen (CN)

(72) Inventors: Rongzhi Gu, Shenzhen (CN); Shixiong Zhang, Shenzhen (CN); Lianwu Chen, Shenzhen (CN); Yong Xu, Shenzhen (CN); Meng Yu, Shenzhen (CN); Dan Su, Shenzhen (CN); Dong Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 323 days.

(21) Appl. No.: 17/401,125

(22) Filed: Aug. 12, 2021

(65) Prior Publication Data
US 2021/0375294 A1 Dec. 2, 2021

Related U.S. Application Data

(63) Continuation of application No. PCT/CN2020/100064, filed on Jul. 3, 2020.

(30) Foreign Application Priority Data

Jul. 24, 2019 (CN) .......................... 201910671562.1

(51) Int. Cl.
| | |
|---|---|
| *G10L 19/008* | (2013.01) |
| *G10L 25/03* | (2013.01) |
| *G10L 25/30* | (2013.01) |
| *H04S 3/02* | (2006.01) |
| *H04S 5/00* | (2006.01) |

(52) U.S. Cl.
CPC ............ *G10L 19/008* (2013.01); *G10L 25/03* (2013.01); *G10L 25/30* (2013.01); *H04S 3/02* (2013.01); *H04S 5/00* (2013.01)

(58) Field of Classification Search
CPC ....... G10L 19/008; G10L 25/03; G10L 25/30; G10L 21/0308; G10L 15/063;
(Continued)

(56) References Cited

U.S. PATENT DOCUMENTS 8,694,306 B1 * 4/2014 Short ...................... G10L 15/14
704/200
2011/0224980 A1 9/2011 Nakadai et al.
(Continued)

FOREIGN PATENT DOCUMENTS

| CN | 103165136 A | 6/2013 |
|---|---|---|
| CN | 103270508 A | 8/2013 |

(Continued)

OTHER PUBLICATIONS

Extended European Search Report, EP20844066.9, dated Jul. 20, 2022, 11 pgs.
(Continued)

*Primary Examiner* — Xu Mei
(74) *Attorney, Agent, or Firm* — Morgan, Lewis & Bockius LLP

(57) ABSTRACT

This application relates to a method of extracting an inter channel feature from a multi-channel multi-sound source mixed audio signal performed at a computing device. The method includes: transforming one channel component of a multi-channel multi-sound source mixed audio signal into a single-channel multi-sound source mixed audio representation in a feature space; performing a two-dimensional dilated convolution on the multi-channel multi-sound source mixed audio signal to extract inter-channel features; per-
(Continued)

forming a feature fusion on the single-channel multi-sound source mixed audio representation and the inter-channel features; estimating respective weights of sound sources in the single-channel multi-sound source mixed audio representation based on a fused multi-channel multi-sound source mixed audio feature; obtaining respective representations of the plurality of sound sources according to the single-channel multi-sound source mixed audio representation and the respective weights; and transforming the respective representations of the sound sources into respective audio signals of the plurality of sound sources.

20 Claims, 7 Drawing Sheets

(58) Field of Classification Search
CPC ...... G10L 21/0272; G06N 3/045; G06N 3/08; H04S 3/02; H04S 5/00; H04S 5/005; H04S 5/02
USPC .............. 381/94.1, 66, 17–23; 702/190, 191
See application file for complete search history.

(56) References Cited

U.S. PATENT DOCUMENTS

| | | | | |
|---|---|---|---|---|
| 2018/0122403 | A1* | 5/2018 | Koretzky | G10L 21/028 |
| 2019/0066713 | A1* | 2/2019 | Mesgarani | G10L 17/26 |
| 2019/0180142 | A1* | 6/2019 | Lim | G10L 21/0272 |
| 2023/0186937 | A1* | 6/2023 | Uhlich | G10L 15/08 |
| | | | | 704/251 |

FOREIGN PATENT DOCUMENTS

| | | | |
|---|---|---|---|
| CN | 103811023 | A | 5/2014 |
| CN | 105230044 | A | 1/2016 |
| CN | 108805278 | A | 11/2018 |
| CN | 109830245 | A | 5/2019 |
| CN | 109839612 | A | 6/2019 |
| CN | 110032926 | A | 7/2019 |
| CN | 110400575 | A | 11/2019 |
| WO | WO 2020/042708 | A1* | 3/2020 ............. G01S 3/802 |

OTHER PUBLICATIONS

Rongzhi Gu et al., "Enhancing End-to-End Multi-Channel Speech Separation Via Spatial Feature Learning", arxiv.org, Cornell University Library, Mar. 9, 2020, XP081617432, 5 pgs.
Rongzhi Gu et al., "End-to-End Multi-Channel Speech Separation", May 15, 2019, XP055941311, 6 pgs., Retrieved from the Internet: https://arxiv.org/pdf/1905.06286.pdf.
Tencent Technology, WO, PCT/CN2020/100064, Oct. 14, 2020, 5 pgs.
Tencent Technology, IPRP, PCT/CN2020/100064, Jan. 25, 2022, 6 pgs.
Tencent Technology, ISR, PCT/CN2020/100064, Oct. 14, 2020, 3 pgs.

* cited by examiner

INTER-CHANNEL FEATURE EXTRACTION METHOD, AUDIO SEPARATION METHOD AND APPARATUS, AND COMPUTING DEVICE

CROSS-REFERENCE TO RELATED APPLICATIONS

This application is a continuation application of PCT Patent Application No. PCT/CN2020/100064, entitled "INTER-CHANNEL FEATURE EXTRACTION METHOD, AUDIO SEPARATION METHOD AND APPARATUS, AND COMPUTING DEVICE" filed on Jul. 3, 2020, which claims priority to Chinese Patent Application No. 201910671562.1, filed with the State Intellectual Property Office of the People's Republic of China on Jul. 24, 2019, and entitled "INTER-CHANNEL FEATURE EXTRACTION METHOD, AUDIO SEPARATION METHOD AND APPARATUS, AND COMPUTING DEVICE", all of which are incorporated herein by reference in their entirety.

FIELD OF THE TECHNOLOGY

This application relates to audio processing technologies, and in particular, to an inter-channel feature extraction method of a multi-channel multi-sound source mixed audio signal, an audio separation method and apparatus of a multi-channel multi-sound source mixed audio signal, a computing device, a computer-readable storage medium, and a multi-sound source audio separation system.

BACKGROUND OF THE DISCLOSURE

Due to the effects of time-frequency sparsity and masking of speech signals, classic multi-speaker mixed speech separation methods are mostly performed in a time-frequency domain. For example, a time-frequency mask is estimated for each sound source, and a mask value of each time-frequency unit represents a degree of dominance of the sound source or a probability of dominance of the sound source. However, methods based on the time-frequency domain entail complex phase estimation and phase reconstruction problems, limiting improvement of the performance. Moreover, the extraction of inter-channel features of the time-frequency domain (for example, a time difference between two ears, a phase difference between two ears, and an intensity difference between two ears) is usually troublesome, which requires a long processing time and leads to problems such as poor real-time performance of a system.

SUMMARY

It is advantageous to provide a mechanism that can alleviate or even eliminate one or more of the foregoing problems.

According to some embodiments of this application, an inter-channel feature extraction method of a multi-channel multi-sound source mixed audio signal is provided, including: receiving a multi-channel multi-sound source mixed audio signal, the multi-channel multi-sound source mixed audio signal including C channel components, each channel component including S sampling points, C and S being integers greater than or equal to 2; performing a two-dimensional dilated convolution on the multi-channel multi-sound source mixed audio signal based on an inter-channel dilation coefficient z, an inter-channel stride p, and n two-dimensional convolution kernels of the same size to generate n feature maps, the n feature maps including spatial distribution information of a plurality of sound sources, z and n being integers, $1 \le z < C$, $n \ge 1$, h being a height of each two-dimensional convolution kernel, 1 being a length of each two-dimensional convolution kernel, $1 \le S$; and According to some embodiments of this application, an audio separation method of a multi-channel multi-sound source mixed audio signal is provided, including: transforming one of a plurality of channel components of the multi-channel multi-sound source mixed audio signal into a single-channel multi-sound source mixed audio representation in a feature space; performing a two-dimensional dilated convolution on the multi-channel multi-sound source mixed audio signal to extract a plurality of inter-channel features; performing a feature fusion on the single-channel multi-sound source mixed audio representation and the plurality of inter-channel features to obtain a fused multi-channel multi-sound source mixed audio feature; estimating respective weights of a plurality of sound sources in the single-channel multi-sound source mixed audio representation based on the fused multi-channel multi-sound source mixed audio feature; obtaining respective representations of the plurality of sound sources according to the single-channel multi-sound source mixed audio representation and the respective weights; and transforming the respective representations of the plurality of sound sources into respective audio signals of the plurality of sound sources.

According to some embodiments of this application, an audio separation apparatus of a multi-channel multi-sound source mixed audio signal is provided, including: an encoder module, configured to transform one of a plurality of channel components of the multi-channel multi-sound source mixed audio signal into a single-channel multi-sound source mixed audio representation in a feature space; an inter-channel feature extraction module, configured to perform a two-dimensional dilated convolution on the multi-channel multi-sound source mixed audio signal to extract a plurality of inter-channel features; a feature fusion module, configured to perform a feature fusion on the single-channel multi-sound source mixed audio representation and the plurality of inter-channel features to obtain a fused multi-channel multi-sound source mixed audio feature; a separation module, configured to estimate respective weights of a plurality of sound sources in the single-channel multi-sound source mixed audio representation based on the fused multi-channel multi-sound source mixed audio feature; a weighting module, configured to obtain respective representations of the plurality of sound sources according to the single-channel multi-sound source mixed audio representation and the respective weights; and a decoder module, configured to transform the respective representations of the plurality of sound sources into respective audio signals of the plurality of sound sources.

According to some embodiments of this application, a computing device is provided, including a processor and a memory, the memory storing instructions, the instructions, when executed on the processor, causing the processor to perform any one of implementations in the foregoing audio separation method.

According to some embodiments of this application, a non-transitory computer-readable storage medium is provided, storing instructions, the instructions, when executed on a processor, causing the processor to perform any one of implementations in the foregoing audio separation method.

According to some embodiments of this application, a multi-sound source audio separation system is provided, including: an acoustic sensor array, configured to obtain a multi-channel multi-sound source mixed audio signal; and the computing device as described above.

The embodiments of this application provide various advantages. In the embodiments of an inter-channel feature extraction method, a two-dimensional dilated convolution may automatically learn inter-channel features. Compared with the solution of manually extracting general inter-channel features, this method speeds up a network training process and improves the real-time performance of a system. In a setting scenario, the performance of the system can be improved. In the embodiments of the audio separation method and apparatus, an end-to-end neural network is constructed and two-dimensional dilated convolution kernels are initialized in a training phase, so that difference information between channels can be better found and encoded. Compared with a single-channel time-domain method, in the embodiments of the audio separation method and apparatus, inter-channel cues are integrated, and the nonlinear fitting ability of a neural network is used to learn more discriminative feature representations, thereby providing a better separation effect.

BRIEF DESCRIPTION OF THE DRAWINGS

In the following description of exemplary embodiments with reference to the accompanying drawings, more details, features, and advantages of this application are disclosed. In the accompanying drawings.

DESCRIPTION OF EMBODIMENTS

Figure 1:
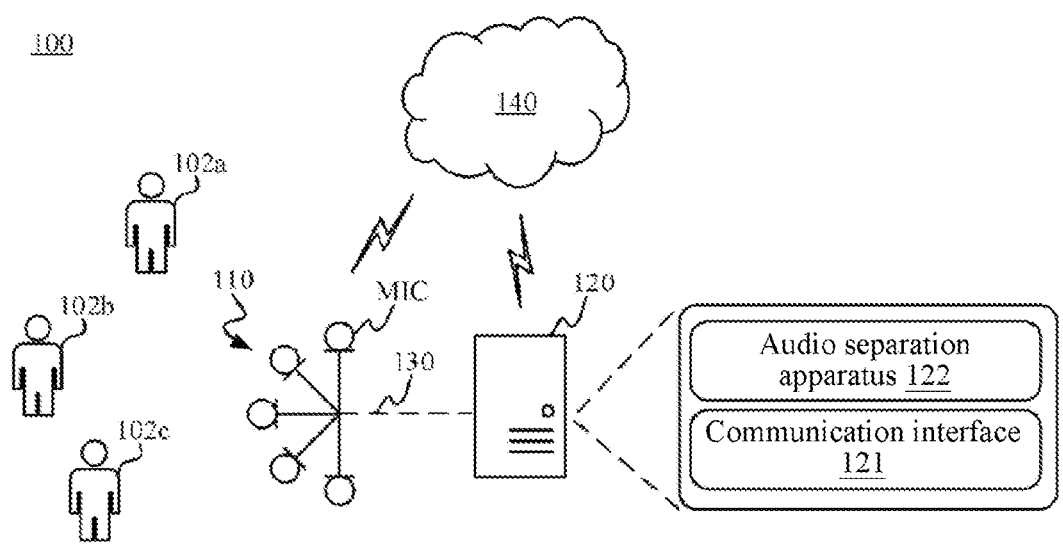
FIG. 1 is a schematic diagram of an exemplary system to which an audio separation method according to an embodiment of this application is applicable.

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing (NLP) technology, and machine learning (ML)/deep learning.

CV is a science that studies how to use a machine to "see". To be more specific, CV performs recognition, tracking, and measurement on a target using a camera and a computer instead of human eyes, and further performs graphics processing, so that the computer processes the target into an image suitable for human eyes to observe, or an image suitable for being transmitted to an instrument for detection. As a scientific discipline, CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional (3D) object reconstruction, a 3D technology, virtual reality, augmented reality, synchronous positioning, and map construction, and further include biological feature recognition technologies such as common face recognition and fingerprint recognition.

Key technologies of the speech technology include an automatic speech recognition (ASR) technology, a text-to-speech (TTS) technology, and a voiceprint recognition technology. To make a computer capable of listening, seeing, speaking, and feeling is the future development direction of human-computer interaction, and speech has become one of the most promising human-computer interaction methods in the future.

NLP is an important direction in the fields of computer science and AI. NLP studies various theories and methods for implementing effective communication between human and computers through natural languages. NLP is a science that integrates linguistics, computer science and mathematics. Therefore, studies in this field relate to natural languages, that is, languages used by people in daily life, and NLP is closely related to linguistic studies. The NLP technology generally includes technologies such as text processing, semantic understanding, machine translation, robot question and answer, and knowledge graph.

ML is an interdisciplinarity involving a plurality of disciplines such as the probability theory, statistics, approximation theory, convex analysis, algorithm complexity theory, and the like. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

Autonomous driving technologies usually include high-precision maps, environment perception, behavior decision-making, path planning, motion control, and other technologies. Self-determined driving technology has a wide range of application prospects.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in embodiments of this application involve technologies such as AI audio processing and artificial neural networks, which are specifically described in the following embodiments.

Before the embodiments of this application are described, several terms used herein are explained. The concepts are known to those skilled in the field of AI, and for the sake of brevity, detailed descriptions of the concepts are omitted herein.

1. Dilated convolution. A dilated convolution, also known as an atrous convolution, introduces a new parameter "dilation coefficient" or "dilation rate" into a convolutional layer, and this parameter defines a spacing between convolutional values in data when a convolution kernel processes the data. For example, a dilated convolution is performed on two-dimensional data. If a dilation coefficient is 1, operation of the dilated convolution is the same as an ordinary convolution. If in a dimension, a dilation coefficient is 2, in this dimension, a spacing between to-be-convolved data points in the two-dimensional data is 2, or in other words, in this dimension, one dilation exists between adjacent to-be-convolved data points in the two-dimensional data.

2. End-to-end neural network. "End-to-end" is discussed in terms of a multi-step solution. For example, in a speech recognition scenario, a conventional speech recognition system includes a plurality of modules, for example, an acoustic model, a pronunciation dictionary, and a language model. The training of the modules is generally carried out independently, and each module has its own target function. Since the modules cannot learn from each other during training, and trained target functions deviate from an overall performance index of the system, the trained network often fails to achieve optimal performance. In contrast, in an end-to-end neural network, there is no longer an independent acoustic model, pronunciation dictionary, language model or other modules. Instead, a neural network is used to connect an input end (a voice waveform) directly to an output end (a word or character sequence), making this neural network take on the functions of all the original modules. In this way, a result is directly obtained at the output end from data at the input end. In a scenario of separating a multi-sound source mixed audio signal, data at an input end is, for example, a multi-sound source mixed audio signal, and data at an output end is audio signals of sound sources.

3. Depthwise separable convolution. The depthwise separable convolution decomposes a conventional convolution into a depthwise convolution and a 1×1 convolution (pointwise convolution), which reduces required parameters as compared with an ordinary convolution.

FIG. 1 is a schematic diagram of an exemplary system 100 to which an audio separation method according to an embodiment of this application is applicable. Referring to FIG. 1, the system 100 includes an acoustic sensor array 110 and a computing device 120.

The acoustic sensor array 110 includes a plurality of acoustic sensors, for example, a microphone (MIC) for picking up audio signals (for example, speech signals) from a plurality of sound sources (for example, users 102a, 102b, and 102c). Each acoustic sensor is a "channel". In some embodiments, the acoustic sensor array 110 may be integrated in the computing device 120. In other embodiments, the acoustic sensor array 110 may be spatially separated from the computing device 120. In some embodiments, the plurality of acoustic sensors may be located in different physical locations, for example, distributed in different corners of a room.

The computing device 120 may receive, from the acoustic sensor array 110 via a direct connection 130 (a wired or wireless connection), a multi-channel multi-sound source mixed audio signal (for example, speech signals of the users 102a, 102b, and 102c) picked up by the acoustic sensor array 110. Alternatively or additionally, the computing device 120 may communicate with the acoustic sensor array 110 via a network 140. Examples of the network 140 include a local area network (LAN), a wide area network (WAN), a personal area network (PAN), and/or a combination of communication networks such as the internet.

As shown in FIG. 1, the computing device 120 includes at least one communication interface 121 capable of communicating via the direct connection 130 and/or the network 140. Such a communication interface may be one or more of the following: any type of network interface (for example, a network interface card (NIC)), a wired or wireless (for example, IEEE 802.11 wireless LAN (WLAN)) interface, a worldwide interoperability for microwave access (Wi-MAX) interface, an Ethernet interface, a universal serial bus (USB) interface, a cellular network interface, a Bluetooth™ interface, a near field communication (NFC) interface, and the like. The embodiments of this application are not limited thereto.

The computing device 120 further includes an audio separation apparatus 122 for separating a multi-channel multi-sound source mixed audio signal received from the acoustic sensor array 110 to obtain respective audio signals of sound sources. In the example of FIG. 1, the audio separation apparatus 122 may be used to separate respective speech signals of users 102a, 102b, and 102c from a mixed voice signal picked up by the acoustic sensor array 110. In the embodiments, the computing device 120 is applicable to speech interaction in complex acoustic scenarios, for example, a virtual front desk, a smart speaker, and a smart TV.

Figure 2:
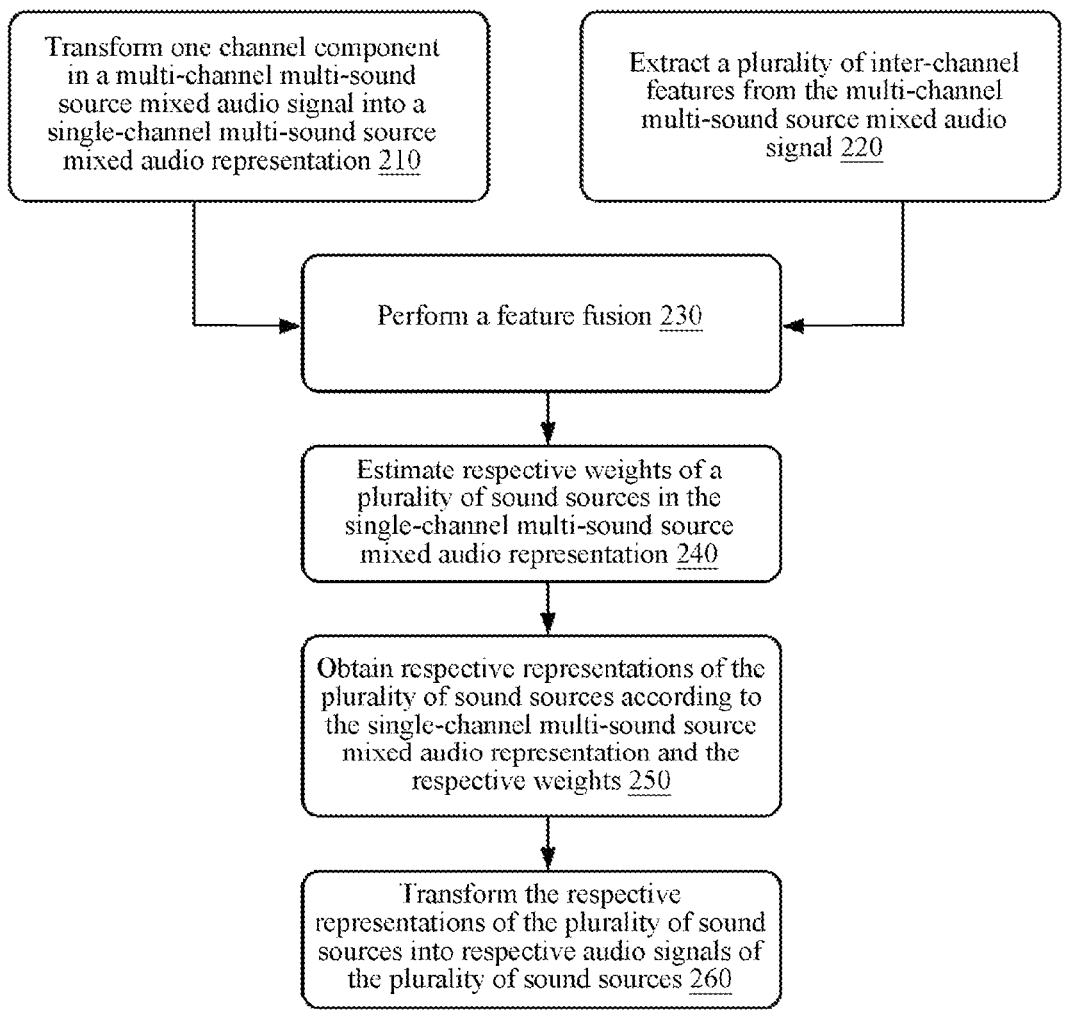
FIG. 2 is a flowchart of an audio separation method according to an embodiment of this application.
Figure 3:
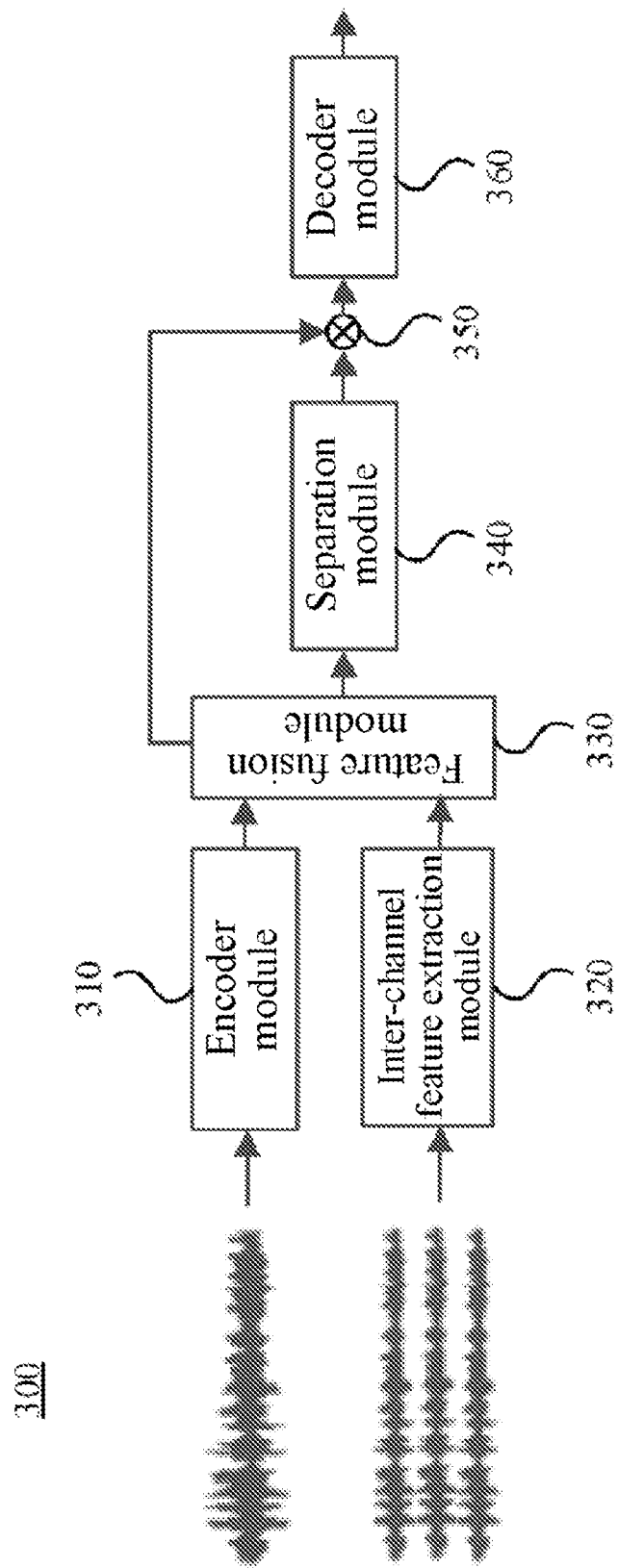
FIG. 3 is a schematic block diagram of an audio separation apparatus according to an embodiment of this application.

The system 100 may be configured in various ways and may be operated in various ways to implement mixed audio separation. For example, FIG. 2 is a flowchart of an audio separation method 200 according to an embodiment of this application. The system 100 may be operated according to the method 200 in the embodiments. FIG. 3 is a schematic block diagram of an audio separation apparatus 300 according to an embodiment of this application. The audio separation apparatus 300 is an example of the audio separation apparatus 122 in FIG. 1. For illustrative purposes, the method 200 of FIG. 2 is described below with reference to FIG. 3.

Step 210: Transform one of a plurality of channel components of a multi-channel multi-sound source mixed audio signal into a single-channel multi-sound source mixed audio representation in a feature space. Step 210 may be implemented by an encoder module 310.

In an embodiment, the multi-channel multi-sound source mixed audio signal and the plurality of channel components thereof are time-domain signals, and each channel component is a time-domain mixed signal of respective audio signals of a plurality of sound sources.

In an embodiment, the encoder module 310 includes a one-dimensional convolutional layer. A channel component $x(t)$ is inputted into the encoder module 310, and the encoder module 310 decomposes a time-domain mixed signal $x(t)$ into a series of basis functions to obtain a non-negative representation w in a feature space. The series of basis functions may be written as a matrix U, and an operation implemented by the encoder module 310 is:

$$w = ReLU(x * U)$$

where $ReLU(\cdot)$ is an activation function, and * represents a convolution operation.

Step 220: Perform a two-dimensional dilated convolution on the multi-channel multi-sound source mixed audio signal to extract a plurality of inter-channel features. Step 220 may be implemented by an inter-channel feature extraction module 320.

In an embodiment, the inter-channel feature extraction module 320 includes one or more two-dimensional convolutional layers, and each two-dimensional convolutional layer includes corresponding n two-dimensional convolution kernels of the same size. If there is only one two-dimensional convolutional layer, a dilated convolution is performed on the multi-channel multi-sound source mixed audio signal and n two-dimensional convolution kernels of the two-dimensional convolutional layer to generate n feature maps as inter-channel features. If there are a plurality of two-dimensional convolutional layers, the plurality of two-dimensional convolutional layers are parallel, and two-dimensional convolution kernels of different two-dimensional convolutional layers may have the same size or different sizes. The multi-channel multi-sound source mixed audio signal is inputted into the different two-dimensional convolutional layers for a dilated convolution, so that each layer in the different two-dimensional convolutional layers generates n feature maps as inter-channel features. The feature maps indicate difference information between channels, and the difference information implies spatial distribution information of a plurality of sound sources. In any case, the same two-dimensional convolutional layer may generate a plurality of inter-channel features by changing an inter-channel dilation coefficient and/or an inter-channel stride.

The inter-channel dilation coefficient is a quantity of intervals of the channels corresponding to the obtained inter-channel features. That is, one channel is taken from channels of a quantity the same as the inter-channel dilation coefficient to calculate the inter-channel features. For example, when the inter-channel dilation coefficient is z, selected channel numbers are z, 2z, 3z, and the like, and obtained inter-channel features are features between channels z, 2z, 3z, and the like. The stride defines the stride size of convolution kernels when the convolution kernels are traversed in an input data matrix. When the stride moved by the convolution kernels is less than the side lengths of the convolution kernels (for example, when a convolution kernel is a square), an overlap of action ranges of the convolution kernels appears on the input data matrix; and when the stride moved by the convolution kernels is the same as the side lengths of the convolution kernels, no overlap appears.

Figure 4:
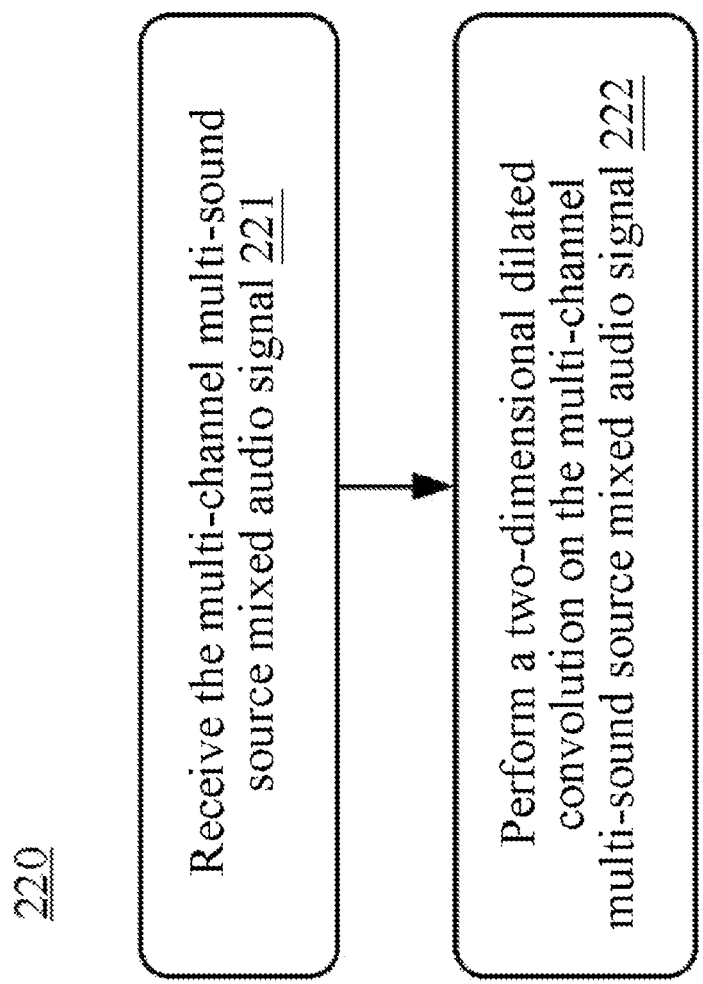
FIG. 4 is a flowchart of steps of extracting inter-channel features in FIG. 2.

FIG. 4 is a flowchart of operation of step 220. Referring to FIG. 4, step 221: Receive the multi-channel multi-sound source mixed audio signal. For example, the multi-channel multi-sound source mixed audio signal acquired by the acoustic sensor array 110 in FIG. 1 and cached in the memory is inputted into the inter-channel feature extraction module 320. Step 222: Perform a two-dimensional dilated convolution on the multi-channel multi-sound source mixed audio signal. For example, the multi-channel multi-sound source mixed audio signal is inputted into one or more two-dimensional convolutional layers of the inter-channel feature extraction module 320, and the two-dimensional dilated convolution is performed on the multi-channel multi-sound source mixed audio signal based on a plurality of different values of the inter-channel dilation coefficient and/or a plurality of different values of the inter-channel stride.

It is assumed that the multi-channel multi-sound source mixed audio signal includes C channel components, each channel component includes S sampling points, and C and S are integers greater than or equal to 2. The multi-channel multi-sound source mixed audio signal is convolved with n two-dimensional convolution kernels with a size of h×l to generate n feature maps, h being the height of each two-dimensional convolution kernel, l being the length of each two-dimensional convolution kernel, $1 \leq S$. The stride of each convolution kernel is set to (p, q), where p is a stride between channels, q is a stride on a sampling point, and the inter-channel dilation coefficient is set to z, $1 \leq z < C$.

Figure 5A:
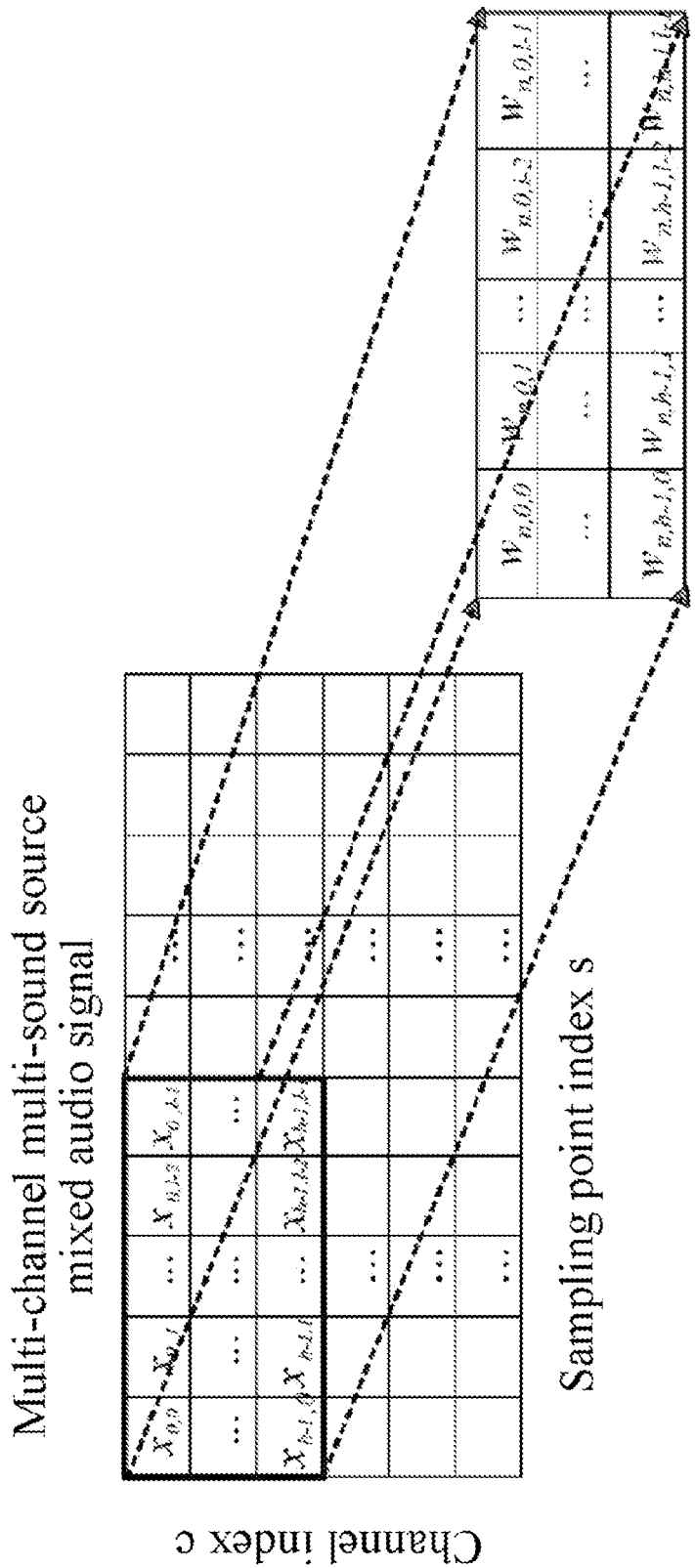
FIG. 5A and FIG. 5B are schematic diagrams of a two-dimensional dilated convolution using different inter-channel dilation coefficients.

FIG. 5A is a schematic diagram of a two-dimensional dilated convolution when the inter-channel dilation coefficient is 1. A value at a position (i, j) of an $n^{th}$ feature map $v_n$ may be expressed as:

$$v_n(i,j) = \Sigma_{l'=0}^{l-1} \Sigma_{h'=0}^{h-1} w_{n,l',h'} x_{pi+zh', qj+l'}, \text{ or}$$

$$v_n(i,j) = \Sigma_{l'=0}^{l-1} \Sigma_{h'=0}^{h-1} w_{n,l',h'} x_{pi+h', qj+l'} (z=1)$$

where pi+h' and qj+l' represent a $(qj+l')^{th}$ sampling point of a $(pi+h')^{th}$ channel inputted into a multi-channel voice waveform, and $w_{n,l',h'}$ represents a parameter of an $n^{th}$ convolution kernel at a (l', h') position. Therefore, n feature maps are obtained, and the size of each feature map is ((C−h)/p+1, (S−l)/q+1).

As described above, the same two-dimensional convolutional layer may generate different inter-channel features by changing an inter-channel dilation coefficient and/or an inter-channel stride. This may find inter-channel features of different combinations of non-adjacent channels (for example, a channel 1 and a channel 3, a channel 1 and a channel 4).

Figure 5B:
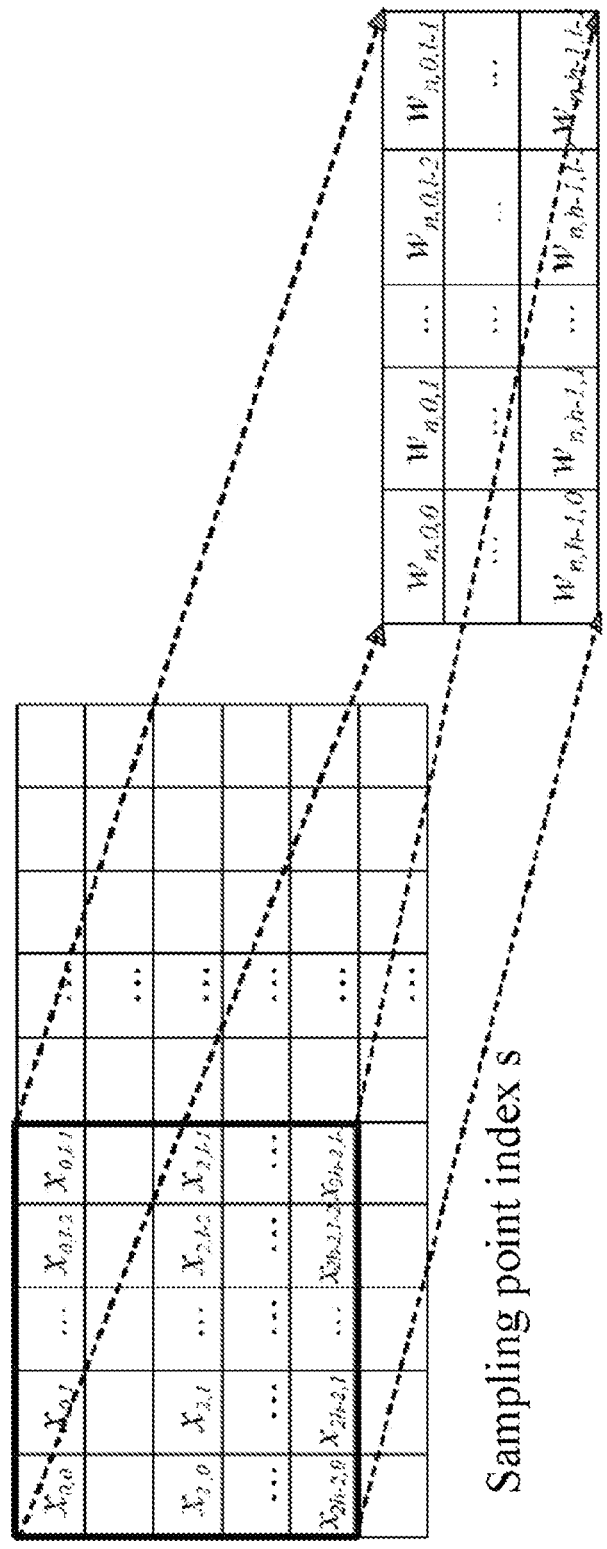

FIG. 5B is a schematic diagram of a two-dimensional dilated convolution when the inter-channel dilation coefficient z is 2. A value at a position (i, j) of the $n^{th}$ feature map $v_n$ may be expressed as:

$$v_n(i,j) = \Sigma_{l'=0}^{l-1} \Sigma_{h'=0}^{h-1} w_{n,l',h'} x_{pi+zh', qj+l'} (z=2).$$

The inter-channel dilation coefficient z may take another value to find more inter-channel features of combinations of non-adjacent channels, which is not repeated herein.

Referring to FIG. 2, although steps 210 and 220 are shown as being performed in parallel, this application is not limited thereto. In other embodiments, steps 210 and 220 may be performed sequentially.

Step 230: Perform a feature fusion on the single-channel multi-sound source mixed audio representation obtained in step 210 and the plurality of inter-channel features obtained in step 220 to obtain a fused multi-channel multi-sound source mixed audio feature. Step 230 may be implemented by a feature fusion module 330.

In an embodiment, the feature fusion module 330 includes a linear layer (for example, a fully connected layer), so that features are simply concatenated. The feature fusion method is not limited to concatenation, but may include, for example, sum, through a projection layer, and the like. Accordingly, in an alternative embodiment, the feature fusion module 330 may include a convolutional layer or a mapping layer.

Step 240: Estimate respective weights of a plurality of sound sources in the single-channel multi-sound source mixed audio representation based on the fused multi-channel multi-sound source mixed audio feature. Step 240 may be implemented by a separation module 340.

In an embodiment, the separation module 340 includes a plurality of stacked depthwise separable dilated convolution networks. The convolutional networks may be connected to a 1×1 convolutional layer at last. The separation module 340 outputs a mask $m_i$ for each sound source, where i=1, 2, ..., I, and I is the total quantity of sound sources (in the example of FIG. 1, I=3). The size of a mask value indicates a degree of contribution of a sound source i to a non-negative representation w, that is, a weight that the sound source i occupies in a single-channel mixed audio representation.

Although step 240 is shown in FIG. 2 as being performed after step 230 and the feature fusion module 330 and separation module 340 are correspondingly shown as being separated from each other in FIG. 3, this application is not limited thereto. In other embodiments, the feature fusion (step 230) may be completed during the separation (step 240). For example, feature fusion is performed after a convolutional network of the separation module 340, and a fused feature continues to pass through the remaining convolutional networks. Correspondingly, the feature fusion module 330 may be used as a network layer and may be embedded between a plurality of convolutional networks of the separation module 340.

Referring to FIG. 2, step 250: Obtain respective representations of the plurality of sound sources according to the single-channel multi-sound source mixed audio representation and the respective weights. Step 250 may be implemented by a weighting module 350.

In an embodiment, a representation of the sound source i may be expressed as:

$$d_i = m_i \odot w$$

where $\odot$ represents an element multiplication, $m_i$ represents a mask of the sound source i, and w represents a single-channel multi-sound source mixed audio representation (non-negative representation).

Step 260: Transform the respective representations of the plurality of sound sources into respective audio signals of the plurality of sound sources. Step 260 may be implemented by a decoder module 360.

In an embodiment, the decoder module 360 includes a one-dimensional convolutional layer. The decoder module 360 reconstructs a representation $d_i$ of the sound source i into a time-domain signal through a linear deconvolution operation:

$$\hat{s}_i = d_i V$$

where V is a basis function matrix of the decoder module 360. In this way, the decoder module 360 outputs estimations of the audio signals of the plurality of sound sources.

Although specific functions are discussed above with reference to specific modules, the functions of each module discussed herein may be divided into a plurality of modules, and/or at least some functions of the plurality of modules may be combined into a single module. In addition, the specific modules that perform an action discussed herein include the specific module itself performing the action, or alternatively the specific modules call or otherwise access another component or module that performs the action (or performs the action in combination with the specific modules). Therefore, the specific modules that perform the action may include the specific modules that perform the action itself and/or another module that is called or otherwise accessed by the specific modules that perform the action.

Similarly, although the operations are depicted in a specific order in the drawings, this is not to be understood as the operations have to be performed in a specific order as shown, nor to be understood as that all the operations shown have to be performed to obtain a desired result.

In some embodiments, a computing device may only include the inter-channel feature extraction module 320 and provide the n feature maps to another computing device for the computing device to use the n feature maps to separate audio signals of sound sources from the multi-channel multi-sound source mixed audio signal.

In some embodiments, the encoder module 310, the inter-channel feature extraction module 320, the feature fusion module 330, the separation module 340, the weighting module 350, and the decoder module 360 described above with reference to FIG. 2 and FIG. 3 are implemented as an end-to-end neural network. Through end-to-end automatic learning of inter-channel features, the real-time performance of the system can be improved.

In the training phase of a neural network, parameters need to be initialized. In this context, the initialization of two-dimensional convolution kernels used in the inter-channel feature extraction module 320 has an impact on the learning and extraction of inter-channel features. Commonly used initialization methods include a Gaussian distribution initialization, a Xavier initialization, a uniform distribution initialization and the like. In the initialization methods, convolution kernel coefficients belonging to channels obey the same distribution. However, the channels may not have a numerical correlation, that is, a value obtained by adding numerical values at corresponding positions of feature maps of each channel may not have a clear physical meaning.

In the embodiments of this application, to extract difference information between channels, the following initialization methods for learning inter-channel features are provided.

1) For all n convolution kernels with a size of h×l in each two-dimensional convolutional layer, let $w_{n', l', 0}=1$, $w_{n', l', 1}=-1$, $w_{n', l', h'}=0$, n'=1, 2, ..., n, l'=0, 1, ..., l−1, and h'=2, 3, ..., h−1. Therefore, a value of the $n^{th}$ feature map $v_n$ at a position (i, j) is a sum of a difference in values of an audio signal between a channel pi and a channel pi+z in an interval from qj to qj+l−1:

$$v_n(i, j) = \sum_{l'=0}^{l-1} x_{pi, qj+l'} - x_{pi+z, qj+l'}$$

2) For all n convolution kernels with a size of h×l in each two-dimensional convolutional layer, let $w_{n', l', 0} \sim N(\mu, \sigma2)$, $w_{n', l', 1} = -w_{n', l', 0}$, $w_{n', l', h'} = 0$, n'=1, 2, ..., n, l'=0, 1, ..., l−1, and h'=2, 3, ..., h−1. $N(\mu, \sigma2)$ is a Gaussian distribution with a mean being μ and a variance being σ2. Therefore, a value of the $n^{th}$ feature map $v_n$ at a position (i, j) is a sum of a product of a difference in waveform values between a channel pi and a channel pi+z and convolution kernel coefficients in an interval from qj to qj+l−1.

$$v_n(i, j) = \sum_{l'=0}^{l-1} w_{n, l', 1}(x_{pi, qj+l'} - x_{pi+z, qj+l'})$$

3) For all n convolution kernels with a size of h×l in each two-dimensional convolutional layer, let $w_{n', l', 0} \sim N(\mu, \sigma2)$, $w_{n', l', 1} = -\lambda w_{n', l', 0}$, $w_{n', l', h'} 0$, n'=1, 2, ..., n, l'=0, 1, ..., l-1, h'=2, 3, ..., h-1. $N(\mu, \sigma2)$ is a Gaussian distribution with a mean being μ and a variance being σ2, and λ is a learnable zoom factor. Therefore, a value at a position (i, j) of the $n^{th}$ feature map $v_n$ is:

$$v_n(i, j) = \sum_{l'=0}^{l-1} w_{n,l',1}(x_{pi,qj+l'} - \lambda x_{pi+z,qj+l'})$$

4) For all n convolution kernels with a size of h×l in each two-dimensional convolutional layer, let $w_{n', l', 0} \sim N(\mu, \sigma2)$, $w_{n', l', 1} = -\lambda_{l'} w_{n', l', 0}$, $w_{n', l', h'} = 0$, n'=1, 2, ..., n, l'=0, 1, ..., l-1, h'=2, 3, ..., h-1. $N(\mu, \sigma2)$ is a Gaussian distribution with a mean being μ and a variance being σ2, and $\lambda_{l'}$ is a learnable zoom factor. This method is similar to 3), but the difference is that the zoom factor varies with l'.

As mentioned above, for different two-dimensional convolutional layers in the inter-channel feature extraction module 320, the size of the two-dimensional convolution kernel h×l may have different values.

Based on initialization parameters, the end-to-end neural network may be trained to better find and encode difference information between channels. The following briefly describes an exemplary training process of the audio separation apparatus 300 implemented as an end-to-end neural network.

First, multi-channel multi-sound source mixed audio data for training is established. In some embodiments, several pieces of original audio data $s_i(t)$ belonging to different sound sources (such as speakers) may be randomly selected from a standard database (such as a Wall Street Journal database), and a scale factor $\alpha_i$ is used to mix the data in the time domain to obtain single-channel multi-sound source mixed audio data $x_i(t) = \sum_{i=1}^{I} \alpha_i s_i(t)$, where I is a total quantity of sound sources. Next, the single-channel multi-sound source mixed audio data may be simulated into multi-channel multi-sound source mixed audio data by changing parameters such as a room reverberation, a room size, and a sound source spatial location. For a typical simulation method, reference may be made to Habets, Emanuel A P. "Room impulse response generator." Technische Universiteit Eindhoven, Tech. Rep 2.2.4 (2006):1. Finally, the obtained multi-channel multi-sound source mixed audio data is divided into a training set and a test set.

In addition, a training objective needs to be set for a training process. The original audio data $s_i(t)$ of the sound sources may be used as supervision data. In an embodiment, a training criterion based on permutation invariant training (PIT) may be used. Specifically, the audio data $\hat{s}_{\theta(i)}(t)$ and the original audio data $s_i(t)$ estimated by using the neural network are used to calculate scores of paired combinations of estimated audio-original audio for different sound sources, where θ(i) represents a paired combination, and a negative value of a score of a paired combination with the highest score is used as a loss function of the neural network. In an example, a scale-invariant speech-to-distortion ratio (SI-SDR) may be calculated as a score. For more information about a PIT training criterion, reference may be made to Yu D, Kolbæk M, Tan Z H, et al. Permutation Invariant Training of Deep Models for Speaker-Independent Multi-talker Speech Separation [J]. 2017:241-245.

Although the foregoing discussion includes several specific implementation details, the details are not to be considered as limitations on any application or the scope of protection that may be claimed but as a description of features that may be limited to specific embodiments of a specific application.

Figure 6:
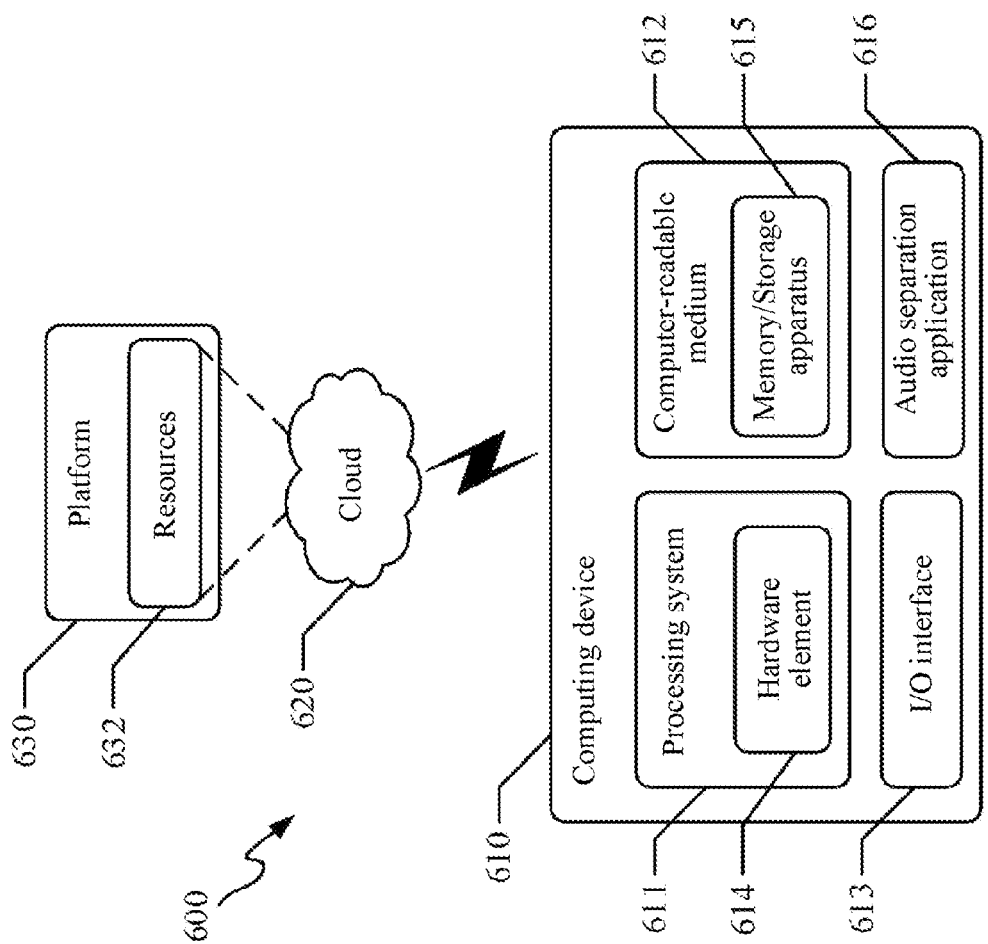
FIG. 6 is an exemplary diagram of a system including an exemplary computing device that can implement various technologies described herein.

FIG. 6 shows an exemplary system generally at 600, which includes an exemplary computing device 610 that can implement technologies described herein. The computing device 610 is an example of the computing device 120 in FIG. 1.

The computing device 610 may be a variety of different types of devices such as a server of a service provider, a device associated with a client (for example, a client device), a system on a chip, and/or any other suitable computing device or computing system. Examples of the computing device 610 include, but are not limited to: a desktop computer, a server computer, a laptop or a netbook computer, a mobile device (for example, a tablet computer or a phablet device, a cellular phone or another wireless phone (for example, a smart phone), a notebook computer, a mobile station, a wearable device (for example, glasses, a watch), an entertainment device (for example, an entertainment appliance, a set-top box communicatively coupled to a display device, and a game console), a television or another display device, a car computer. Therefore, the computing device 610 may range from full-resource devices with a large amount of memory and processor resources (for example, a personal computer and a game console) to low-resource devices with limited memory and/or processing resources (for example, a conventional set-top box and a handheld game console).

The exemplary computing device 610 as illustrated includes a processing system 611, one or more computer-readable media 612, and one or more input/output (I/O) interfaces 613 communicatively coupled to each other. Although not shown, the computing device 610 may include a system bus or another data and command transfer system that couples various components to each other. The system bus may include any one or a combination of different bus structures such as a memory bus or memory controller, a peripheral bus, a universal serial bus, and/or a processor or local bus using any one of various bus architectures. Various other examples are also contemplated, such as control and data lines.

The processing system 611 represents a function of performing one or more operations using hardware. Therefore, the processing system 611 is illustrated as including a hardware element 614 that may be configured as a processor, a functional block, or the like. This may include a dedicated integrated circuit (IC) implemented in hardware or another logic device formed using one or more semiconductors. The hardware element 614 is not limited to a material forming the element or a processing mechanism employed therein. For example, the processor may be composed of semiconductor(s) and/or transistors (for example, electronic ICs). In such context, processor-executable instructions may be electronically executable instructions.

The computer-readable medium 612 is illustrated as including a memory/storage apparatus 615. The memory/storage apparatus 615 represents the memory/storage capacity associated with one or more computer-readable media. The memory/storage apparatus 615 may include a volatile medium (for example, a random access memory (RAM)) and/or a nonvolatile medium (for example, a read-only memory (ROM), a flash memory, an optical disc, a magnetic disk). The memory/storage apparatus 615 may include fixed media (for example, a RAM, a ROM, or a fixed hard drive)

and a removable medium (for example, a flash memory, a removable hard drive, an optical disc). The computer-readable medium 612 may be configured in various other ways as further described below.

The one or more I/O interfaces 613 represent functions that allow the user to enter commands and information into the computing device 610 and also allow various I/O devices to be used to display information to the user and/or other components or devices. Examples of the input device include a keyboard, a cursor control device (for example, a mouse), a microphone (for example, for voice input), a scanner, a touch function (for example, a capacitive sensor or another sensor configured to detect physical touch), a camera (for example, visible or invisible wavelengths (for example, infrared frequencies) may be used to detect a motion that does not involve touch as a gesture), and the like. Examples of the output device include a display device (for example, a monitor or a projector), a speaker, a printer, a network card, a tactile response device, and the like. Therefore, the computing device 610 may be configured in various ways as described further below to support user interaction.

The computing device 610 further includes an audio separation application 616. The audio separation application 616 may be stored in the memory/storage apparatus 615 as computer program instructions. The audio separation application 616 is an example of the audio separation apparatus 122 in FIG. 1.

This application may describe techniques in the general context of software hardware elements or program modules. Generally, the modules include a routine, a program, an object, an element, a component, a data structure, and the like for executing a particular task or implementing a particular abstract data type. The terms "module", "function" and "component" used herein generally refer to software, firmware, hardware, or a combination thereof The features of the technologies described herein are platform-independent, which means that the technologies may be implemented on various computing platforms with various processors.

Implementations of the described modules and technologies may be stored on or transmitted across some form of computer-readable media. The computer-readable medium may include various media that may be accessed by the computing device 610. For example but not limitation, the computer-readable medium may include a "computer-readable storage medium" and a "computer-readable signal medium".

Contrary to mere signal transmission, a carrier wave, or a signal, the "computer-readable storage medium" refers to a medium and/or device, and/or a tangible storage apparatus capable of permanently storing information. Therefore, the computer-readable storage medium refers to a non-signal bearing medium. The computer-readable storage medium is hardware such as a storage device implemented by methods or technologies including volatile and nonvolatile, removable and non-removable media and/or suitable for storing information (for example, computer-readable instructions, data structures, program modules, logic elements/circuits, or other data). Examples of the computer-readable storage medium may include, but are not limited to, a RAM, a ROM, an EEPROM, a flash memory or other memory technologies, a CD-ROM, a digital versatile disk (DVD) or another optical storage apparatus, a hard disk, a cassette tape, a magnetic tape, a disk storage apparatus or other magnetic storage devices, or other storage devices, a tangible medium, or an article suitable for storing desired information and accessible by a computer.

The "computer-readable signal medium" refers to a signal-bearing medium configured to transmit instructions to hardware of the computing device 610, such as via a network. The signal medium may typically embody computer-readable instructions, data structures, program modules, or other data in a modulated data signal such as a carrier wave, a data signal, or other transmission mechanisms. The signal medium further includes any information transmission medium. The term "modulated data signal" refers to a signal that encodes information in the signal in such a way to set or change one or more of a feature thereof. For example but not limitation, a communication medium includes such as a wired network or a wired medium in direct connection, and a wireless medium such as acoustic, RF, infrared, and other wireless media.

As mentioned above, the hardware element 614 and the computer-readable medium 612 represent instructions, modules, programmable device logic and/or fixed device logic implemented in hardware, which in some embodiments can be used to implement at least some aspects of the technique described herein. The hardware component may include an IC or a system on a chip, an application-specific integrated circuit (ASIC), a field programmable gate array (FPGA), a complex programmable logic device (CPLD), and other implementations in silicon or components of other hardware devices. In this context, the hardware element can serve as a processing device that executes a program task defined by instructions, modules, and/or logic embodied by the hardware element, and as a hardware device that stores instructions for execution, for example, as previously described computer-readable storage medium.

The foregoing combinations may also be used to implement the techniques and modules described herein. Therefore, software, hardware or program modules and other program modules may be implemented as one or more instructions and/or logic embodied by one or more hardware elements 614 on some form of the computer-readable storage medium. The computing device 610 may be configured to implement a specific instruction and/or function corresponding to a software and/or hardware module. Therefore, for example, by using the computer-readable storage medium and/or hardware element 614 of the processing system, the module may be implemented at least partially in hardware to implement the module as a module executable by the computing device 610 as software. The instruction and/or function may be executable/operable by one or more articles (for example, one or more computing devices 610 and/or processing systems 611) to implement the techniques, modules, and examples described herein.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The techniques described herein can be supported by the configurations of the computing device 610 and are not limited to specific examples of the techniques described herein. This function can also be implemented in whole or in part on a "cloud" 620 by using a distributed system, for example, through a platform 630 as described below.

The cloud 620 includes and/or represents the platform 630 for resources 632. The platform 630 abstracts an underlying function of hardware (for example, a server) and software resources of the cloud 620. The resources 632 may include an application and/or data that may be used when computer processing is performed on a server remote from the computing device 610. The resources 632 may further include a service provided via the internet and/or via a subscriber network such as a cellular or Wi-Fi network.

The platform 630 may abstract resources and functions to connect the computing device 610 to other computing devices. The platform 630 may further be used for classification of abstract resources to provide a corresponding level of classification of a requirement encountered for the resources 632 implemented via the platform 630. Therefore, in the interconnected device embodiment, the implementation of the functions described herein may be distributed throughout the system 600. For example, the functions may be implemented partially on the computing device 610 and via the platform 630 that abstracts the functions of the cloud 620.

In the discussion herein, different embodiments are described. It is to be appreciated and understood that each embodiment described herein may be used alone or in association with one or more other embodiments described herein.

Although the subject matter has been described in language specific to structural features and/or method actions, it is to be understood that the subject matter defined in the appended claims is not necessarily limited to the specific features or actions described above. Rather, the specific features and actions described above are disclosed as exemplary forms for implementing the claims.

By studying the drawings, the disclosure, and the appended claims, those skilled in the art can understand and implement modifications to the disclosed embodiments when practicing the claimed subject matter. In the claims, the word "comprising" does not exclude other elements or steps, the indefinite article "a" or "an" does not exclude a plurality, and "plurality" means two or more. The mere fact that certain measures are recorded in mutually different dependent claims does not indicate that the combination of the measures cannot be used for profit.

What is claimed is:

1. An audio separation method of a multi-channel multi-sound source mixed audio signal, performed by a computing device by using an artificial neural network, comprising:
   transforming one of a plurality of channel components of the multi-channel multi-sound source mixed audio signal into a single-channel multi-sound source mixed audio representation in a feature space;
   performing a two-dimensional dilated convolution on the multi-channel multi-sound source mixed audio signal to extract a plurality of inter-channel features based on a plurality of different values of an inter-channel dilation coefficient z and/or a plurality of different values of an inter-channel stride p and at least one parallel two-dimensional convolutional layer;
   performing a feature fusion on the single-channel multi-sound source mixed audio representation and the plurality of inter-channel features to obtain a fused multi-channel multi-sound source mixed audio feature;
   estimating respective weights of a plurality of sound sources in the single-channel multi-sound source mixed audio representation based on the fused multi-channel multi-sound source mixed audio feature;
   obtaining respective representations of the plurality of sound sources according to the single-channel multi-sound source mixed audio representation and the respective weights; and
   transforming the respective representations of the plurality of sound sources into respective audio signals of the plurality of sound sources.

2. The method according to claim 1, wherein
   the multi-channel multi-sound source mixed audio signal comprises C channel components, each channel component comprising S sampling points, C and S being integers greater than or equal to 2,
   each two-dimensional convolutional layer comprising corresponding n two-dimensional convolution kernels of the same size, a length of each two-dimensional convolution kernel being less than or equal to S,
   for each value of the inter-channel dilation coefficient z and/or each value of the inter-channel stride p, each two-dimensional convolutional layer performing a two-dimensional dilated convolution on the multi-channel multi-sound source mixed audio signal and the corresponding n two-dimensional convolution kernels of the same size to generate corresponding n feature maps as a corresponding inter-channel feature, z and n being integers, $1 \leq z < C$, and $n \geq 1$.

3. The method according to claim 2, wherein the artificial neural network is implemented as an end-to-end neural network, and
   for each two-dimensional convolutional layer, the n two-dimensional convolution kernels of the same size are initialized in a training phase of the end-to-end neural network according to the following solution:
   letting $w_{n',l',0}=1$, $w_{n',l',h'}=0$, $n'=1, 2, \ldots, n$, $l'=0, 1, \ldots, l-1$, $h'=2, 3, \ldots, h-1$,
   h being a height of each two-dimensional convolution kernel in the two-dimensional convolutional layer, l being a length of each two-dimensional convolution kernel in the two-dimensional convolutional layer, $w_{n',l',h'}$ representing a value of an $(n')^{th}$ two-dimensional convolution kernel at a position (l', h').

4. The method according to claim 2, wherein for each two-dimensional convolutional layer, the n two-dimensional convolution kernels of the same size are initialized in a training phase of the end-to-end neural network according to the following solution:
   letting $w_{n',l',0} \sim N(\mu, \sigma2)$, $0=-w_{n',l',0}$, $w_{n',l',h'}=0$, $n'=1, 2, \ldots, n$, $l'=0, 1, \ldots, l-1$, $h'=2, 3, \ldots, h-1$, $N(\mu, \sigma2)$ being a Gaussian distribution with a mean being $\mu$ and a variance being $\sigma2$,
   h being a height of each two-dimensional convolution kernel in the two-dimensional convolutional layer, l being a length of each two-dimensional convolution kernel in the two-dimensional convolutional layer, $w_{n',l',h'}$ representing a value of an $(n')^{th}$ two-dimensional convolution kernel at a position (l', h').

5. The method according to claim 2, wherein for each two-dimensional convolutional layer, then two-dimensional convolution kernels of the same size are initialized in a training phase of the end-to-end neural network according to the following solution:
   letting $w_{n',l',0} \sim N(\mu, \sigma2)$, $w_{n',l',1}=-\lambda w_{n',l',0}$, $w_{n',l',h'}=0$, $n'=1, 2, \ldots, n$, $l'=0, 1, \ldots, l-1$, $h'=2, 3, \ldots, h-1$, $N(\mu, \sigma2)$ being a Gaussian distribution with a mean being µ and a variance being σ2, λ being a learnable network parameter, h being a height of each two-dimensional convolution kernel in the two-dimensional convolutional layer, l being a length of each two-dimensional convolution kernel in the two-dimensional convolutional layer, $w_{n',l',h'}$ representing a value of an $(n')^{th}$ two-dimensional convolution kernel at a position (l', h').

6. The method according to claim 2, wherein for each two-dimensional convolutional layer, the n two-dimensional convolution kernels of the same size are initialized in a training phase of the end-to-end neural network according to the following solution:

letting $w_{n',l',0}$N(µ, σ2), $w_{n',l',1}=-\lambda_{l'}w_{n',l',h'}=0$ n'=1, 2, ..., n, l'=0, 1, ..., l-1, h'=2, 3, ..., h-1, N(µ, σ2) being a Gaussian distribution with a mean being µ and a variance being σ2, $\lambda_{l'}$ being a learnable network parameter and varying with l', h being a height of each two-dimensional convolution kernel in the two-dimensional convolutional layer, l being a length of each two-dimensional convolution kernel in the two-dimensional convolutional layer, $w_{n',l',h'}$ representing a value of an $(n')^{th}$ two-dimensional convolution kernel at a position (l', h').

7. The method according to claim 2, wherein the at least one two-dimensional convolutional layer comprises a plurality of parallel two-dimensional convolutional layers, and for different two-dimensional convolutional layers in the plurality of two-dimensional convolutional layers, the two-dimensional convolution kernel has different sizes.

8. The method according to claim 1, wherein the artificial neural network is implemented as an end-to-end neural network, and the audio separation method further comprises a training phase of training the end-to-end neural network, the training phase comprising:

establishing, based on original audio data $s_i(t)$ of a plurality of different sound sources, multi-channel multi-sound source mixed audio data for training, i=1, 2, ..., I, I being a total quantity of the different sound sources; and training the end-to-end neural network by using the multi-channel multi-sound source mixed audio data based on a permutation invariance training criterion, audio data $\hat{s}_{\theta(i)}(t)$ estimated by the end-to-end neural network and the original audio data $s_i(t)$ being used to calculate scores of paired combinations of estimated audio-original audio for the different sound sources, θ(i) representing a paired combination, a negative value of a score of a paired combination with the highest score being used as a loss function of the end-to-end neural network.

9. A computing device, comprising a processor and a memory, the memory storing instructions, the instructions, when executed on the processor, causing the processor to perform a plurality of operations including:

transforming one of a plurality of channel components of the multi-channel multi-sound source mixed audio signal into a single-channel multi-sound source mixed audio representation in a feature space;

performing a two-dimensional dilated convolution on the multi-channel multi-sound source mixed audio signal to extract a plurality of inter-channel features based on a plurality of different values of an inter-channel dilation coefficient z and/or a plurality of different values of an inter-channel stride p and at least one parallel two-dimensional convolutional layer;

performing a feature fusion on the single-channel multi-sound source mixed audio representation and the plurality of inter-channel features to obtain a fused multi-channel multi-sound source mixed audio feature;

estimating respective weights of a plurality of sound sources in the single-channel multi-sound source mixed audio representation based on the fused multi-channel multi-sound source mixed audio feature;

obtaining respective representations of the plurality of sound sources according to the single-channel multi-sound source mixed audio representation and the respective weights; and transforming the respective representations of the plurality of sound sources into respective audio signals of the plurality of sound sources.

10. The computing device according to claim 9, wherein the multi-channel multi-sound source mixed audio signal comprises C channel components, each channel component comprising S sampling points, C and S being integers greater than or equal to 2, each two-dimensional convolutional layer comprising corresponding n two-dimensional convolution kernels of the same size, a length of each two-dimensional convolution kernel being less than or equal to S, for each value of the inter-channel dilation coefficient z and/or each value of the inter-channel stride p, each two-dimensional convolutional layer performing a two-dimensional dilated convolution on the multi-channel multi-sound source mixed audio signal and the corresponding n two-dimensional convolution kernels of the same size to generate corresponding n feature maps as a corresponding inter-channel feature, z and n being integers, 1≤z<C, and n≥1.

11. The computing device according to claim 10, wherein the artificial neural network is implemented as an end-to-end neural network, and for each two-dimensional convolutional layer, the n two-dimensional convolution kernels of the same size are initialized in a training phase of the end-to-end neural network according to the following solution:

letting $w_{n',l',0}$=1, $w_{n',l',1}$=-1, $w_{n',l',h}$=0, n'=1,2, ..., n, l'=0, 1, ..., l-1, h'=2,3, ..., h-1, h being a height of each two-dimensional convolution kernel in the two-dimensional convolutional layer, l being a length of each two-dimensional convolution kernel in the two-dimensional convolutional layer, $w_{n',l',h'}$ representing a value of an $(n')^{th}$ two-dimensional convolution kernel at a position (l', h').

12. The computing device according to claim 10, wherein for each two-dimensional convolutional layer, the n two-dimensional convolution kernels of the same size are initialized in a training phase of the end-to-end neural network according to the following solution:

letting $w_{n',l',0} \sim N(µ, σ2)$, $0=-w_{n',l',0}$, $w_{n',l',h}$=0, n'=1, 2, ..., n, l'=0, 1, ..., l-1, h'=2, 3, ..., h-1, N(µ, σ2) being a Gaussian distribution with a mean being µ and a variance being σ2, h being a height of each two-dimensional convolution kernel in the two-dimensional convolutional layer, l being a length of each two-dimensional convolution kernel in the two-dimensional convolutional layer, $w_{n',l',h'}$ representing a value of an $(n')^{th}$ two-dimensional convolution kernel at a position (l', h').

13. The computing device according to claim 10, wherein for each two-dimensional convolutional layer, the n two-dimensional convolution kernels of the same size are initialized in a training phase of the end-to-end neural network according to the following solution:

letting $w_{n',l',0} \sim N(\mu, \sigma 2)$, $w_{n',l',1} = -\lambda w_{n',l',0}$, $w_{n',l',h'} = 0$, n'=1, 2, ..., n, l'=0, 1, ..., l–1, h'=2, 3, ..., h–1, $N(\mu, \sigma 2)$ being a Gaussian distribution with a mean being μ and a variance being σ2, λ being a learnable network parameter, h being a height of each two-dimensional convolution kernel in the two-dimensional convolutional layer, l being a length of each two-dimensional convolution kernel in the two-dimensional convolutional layer, $w_{n',l',h'}$ representing a value of an $(n')^{th}$ two-dimensional convolution kernel at a position (l', h').

14. The computing device according to claim 10, wherein for each two-dimensional convolutional layer, the n two-dimensional convolution kernels of the same size are initialized in a training phase of the end-to-end neural network according to the following solution:

letting $w_{n',l',0} \sim N(\mu, \sigma 2)$, $w_{n',l',1} = -\lambda_{l'} w_{n',l',h'} = 0$, n'=1, 2, ..., n, l'=0, 1, ..., l–1, h'=2, 3, ..., h–1, $N(\mu, \sigma 2)$ being a Gaussian distribution with a mean being μ and a variance being σ2, $\lambda_{l'}$ being a learnable network parameter and varying with l', h being a height of each two-dimensional convolution kernel in the two-dimensional convolutional layer, l being a length of each two-dimensional convolution kernel in the two-dimensional convolutional layer, $w_{n',l',h'}$ representing a value of an $(n')^{th}$ two-dimensional convolution kernel at a position (l', h').

15. The computing device according to claim 10, wherein the at least one two-dimensional convolutional layer comprises a plurality of parallel two-dimensional convolutional layers, and for different two-dimensional convolutional layers in the plurality of two-dimensional convolutional layers, the two-dimensional convolution kernel has different sizes.

16. The computing device according to claim 9, wherein the artificial neural network is implemented as an end-to-end neural network, and the audio separation method further comprises a training phase of training the end-to-end neural network, the training phase comprising:

establishing, based on original audio data $s_i(t)$ of a plurality of different sound sources, multi-channel multi-sound source mixed audio data for training, i=1, 2, ..., I, I being a total quantity of the different sound sources; and training the end-to-end neural network by using the multi-channel multi-sound source mixed audio data based on a permutation invariance training criterion, audio data $\hat{s}_{\theta(i)}(t)$ estimated by the end-to-end neural network and the original audio data $s_i(t)$ being used to calculate scores of paired combinations of estimated audio-original audio for the different sound sources, θ(i) representing a paired combination, a negative value of a score of a paired combination with the highest score being used as a loss function of the end-to-end neural network.

17. A non-transitory computer-readable storage medium, storing instructions, the instructions, when executed on a processor, causing the processor to perform a plurality of operations including:

transforming one of a plurality of channel components of the multi-channel multi-sound source mixed audio signal into a single-channel multi-sound source mixed audio representation in a feature space;

performing a two-dimensional dilated convolution on the multi-channel multi-sound source mixed audio signal to extract a plurality of inter-channel features based on a plurality of different values of an inter-channel dilation coefficient z and/or a plurality of different values of an inter-channel stride p and at least one parallel two-dimensional convolutional layer;

performing a feature fusion on the single-channel multi-sound source mixed audio representation and the plurality of inter-channel features to obtain a fused multi-channel multi-sound source mixed audio feature;

estimating respective weights of a plurality of sound sources in the single-channel multi-sound source mixed audio representation based on the fused multi-channel multi-sound source mixed audio feature;

obtaining respective representations of the plurality of sound sources according to the single-channel multi-sound source mixed audio representation and the respective weights; and transforming the respective representations of the plurality of sound sources into respective audio signals of the plurality of sound sources.

18. The non-transitory computer-readable storage medium according to claim 17, wherein the multi-channel multi-sound source mixed audio signal comprises C channel components, each channel component comprising S sampling points, C and S being integers greater than or equal to 2, each two-dimensional convolutional layer comprising corresponding n two-dimensional convolution kernels of the same size, a length of each two-dimensional convolution kernel being less than or equal to S, for each value of the inter-channel dilation coefficient z and/or each value of the inter-channel stride p, each two-dimensional convolutional layer performing a two-dimensional dilated convolution on the multi-channel multi-sound source mixed audio signal and the corresponding n two-dimensional convolution kernels of the same size to generate corresponding n feature maps as a corresponding inter-channel feature, z and n being integers, 1≤z<C, and n≥1.

19. The non-transitory computer-readable storage medium according to claim 18, wherein the artificial neural network is implemented as an end-to-end neural network, and for each two-dimensional convolutional layer, the n two-dimensional convolution kernels of the same size are initialized in a training phase of the end-to-end neural network according to the following solution:

letting $w_{n',l',0} = 1 w_{n',l',1} = -1$, $w_{n',l',h'} = 0$, n'=1,2, ..., n, l'=0, 1, ..., l–1, h'=2, 3, ..., h–1, h being a height of each two-dimensional convolution kernel in the two-dimensional convolutional layer, l being a length of each two-dimensional convolution kernel in the two-dimensional convolutional layer, $w_{n',l',h'}$ representing a value of an $(n')^{th}$ two-dimensional convolution kernel at a position (l', h').

20. The non-transitory computer-readable storage medium according to claim 18, wherein for each two-dimensional convolutional layer, the n two-dimensional convolution kernels of the same size are initialized in a training phase of the end-to-end neural network according to the following solution:

letting $w_{n',l',0} \sim N(\mu, \sigma 2)$, $0 = -w_{n',l',0}$, $w_{n',l',h'} = 0$, n'=1, 2, ..., l–1, h'=2, 3, ..., h–1, $N(\mu, \sigma 2)$ being a Gaussian distribution with a mean being μ and a variance being σ2, h being a height of each two-dimensional convolution kernel in the two-dimensional convolutional layer, l being a length of each two-dimensional convolution kernel in the two-dimensional convolutional layer, $w_{n',l',h'}$ representing a value of an $(n')^{th}$ two-dimensional convolution kernel at a position (l', h').

* * * * *